(12) United States Patent
Seksaria et al.

(10) Patent No.: US 7,163,219 B2
(45) Date of Patent: Jan. 16, 2007

(54) CONTROL ARM FOR MOTOR VEHICLE SUSPENSION SYSTEM

(75) Inventors: Dinesh Seksaria, Novi, MI (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 60 days.

(21) Appl. No.: 10/271,449

(22) Filed: Oct. 16, 2002

(65) Prior Publication Data

US 2004/0075234 A1 Apr. 22, 2004

(51) Int. Cl.
*B60G 3/06* (2006.01)

(52) U.S. Cl. .................. 280/124.133; 280/124.134

(58) Field of Classification Search ......... 280/124.133, 280/124.134, 124.135, 124.136, 124.143, 280/124.137
See application file for complete search history.

(56) References Cited

U.S. PATENT DOCUMENTS

| | | | |
|---|---|---|---|
| 4,537,420 A * | 8/1985 | Ito et al. .................. 280/86.75 |
| 4,625,995 A * | 12/1986 | Aubry et al. .......... 280/124.128 |
| 4,715,615 A * | 12/1987 | Kijima et al. ......... 280/124.133 |
| 5,362,090 A * | 11/1994 | Takeuchi ............. 280/124.152 |
| 5,533,780 A | 7/1996 | Larson et al. ................ 296/194 |
| 5,556,119 A * | 9/1996 | Buchner et al. ...... 280/124.134 |
| 5,641,175 A * | 6/1997 | Maeda et al. .......... 280/124.137 |
| 5,662,349 A * | 9/1997 | Hasshi et al. ......... 280/124.134 |
| 5,695,213 A * | 12/1997 | Nakamura et al. .... 280/124.134 |
| 6,070,445 A * | 6/2000 | Holierhoek .................... 72/61 |
| 6,108,193 A | 8/2000 | Haberstroh ................. 361/600 |
| 6,152,468 A * | 11/2000 | Glaser et al. ......... 280/124.134 |
| 6,216,810 B1 | 4/2001 | Nakai et al. ............... 180/68.4 |
| 6,276,477 B1 | 8/2001 | Ida ........................... 180/89.1 |
| 6,293,615 B1 | 9/2001 | Tarahomi .................... 296/194 |
| 6,308,999 B1 | 10/2001 | Tan et al. .................... 293/109 |
| 6,334,645 B1 | 1/2002 | Ban ............................ 296/198 |
| 6,336,624 B1 | 1/2002 | Kulhavy .................. 267/64.12 |
| 6,357,821 B1 | 3/2002 | Maj et al. ................... 296/194 |
| 6,416,119 B1 | 7/2002 | Gericke et al. ............. 296/205 |
| 6,767,021 B1 * | 7/2004 | Schnurpel .............. 280/124.13 |
| 2004/0135337 A1 * | 7/2004 | Alesso et al. ......... 280/124.134 |

* cited by examiner

*Primary Examiner*—David R. Dunn
(74) *Attorney, Agent, or Firm*—Greenberg Traurig; Harry A. Hild, Jr.

(57) ABSTRACT

A lower control arm for a motor vehicle suspension includes a first member in the form of an elongated hollow member and a second member attached to the first member. The second member has a solid cross section. The second member has a first end attached to the first member and a second end configured for connection to the motor vehicle body. The first member may have at least one opening extending transversely therethrough for connecting the first member to the motor vehicle suspension system.

26 Claims, 5 Drawing Sheets

CONTROL ARM FOR MOTOR VEHICLE SUSPENSION SYSTEM

BACKGROUND OF THE INVENTION

1. Field of the Invention

The present invention relates to a control arm for a motor vehicle suspension system and, more particularly, to a lighter weight lower control arm for a motor vehicle suspension system that meets required performance attributes for the suspension system.

2. Description of Prior Art

Lower control arms are used in motor vehicle suspension systems. Currently, lower control arms used m the automotive industry are usually made as an assembly of steel stampings, which are welded together. Some lower control arms used for heavy duty applications (i.e., Sport Utility Vehicles ("SUV's") or high performance vehicles (i.e., sports cars)) are provided as one-piece cast gray or ductile iron lower control arms. Either of these approaches results in a suspension system having considerable weight. The weight of these lower control arms negatively affects the ride and handling characteristics of these vehicles, as well as increasing fuel consumption.

In recent years, some luxury and sport utility vehicle (SUV) manufacturers have begun using one-piece cast aluminum lower control arms to obtain the required vehicle handling performance. Generally, this approach substitutes aluminum for ferrous metals. However, the cost of these one-piece aluminum components is generally considered to be too great for wider use in the automotive industry. Some manufacturers have tried to reduce the weight of lower control arms by making the aluminum castings as hollow cast components. This reduces the weight of the castings but increases their manufacturing costs substantially.

Numerous approaches are known in the automotive industry for making control and suspension arms. For example, U.S. Pat. No. 6,311,996 to Kato et al. discloses a suspension arm comprised of a bent arm member that is made of aluminum alloy and is manufactured by extrusion. U.S. Pat. No. 6,241,267 to Dziadosz et al. discloses a control arm for use in a motor vehicle suspension system that is comprised of two W-shaped cross section members, which are coupled together with bushings that include a compressible member. U.S. Pat. No. 6,149,198 to Klaas discloses a rear axle cradle that is constructed from two hydroformed aluminum tubes, which are connected together. U.S. Pat. No. 5,695,213 to Nakamura et al discloses a suspension arm that is formed by two overlapping shells, which form a tube. The shells are welded together U.S. Pat. No. 5,662,349 to Hasshi et al. discloses a suspension arm having an L-shaped arm body in the form of a hydroformed pipe. U.S. Pat. No. 5,338,056 to Vrana et al. discloses an upper control arm for a motor vehicle suspension system having a triangular shaped hollow cross section. Further, U.S. Pat. No. 4,625,995 to Aubry et al. discloses a suspension arm made of resin fiber.

While numerous approaches for making control and suspension arms are known in the art, there is considerable room for improvement in the field to reduce the weight and cost of control and suspension arms, particularly lower control arms for motor vehicle suspension systems, while not sacrificing performance characteristics.

SUMMARY OF THE INVENTION

The present invention is a control arm for a motor vehicle suspension system. In particular, the present invention is a lower control arm for a motor vehicle suspension system. The control arm is comprised of two members, a first member and a second member. The first member is comprised of an elongated hollow member defining at least one opening extending transversely therethrough for connecting the first member to the motor vehicle suspension system. The second member is comprised of a solid cross section member having a first end and a second end. The first end is attached to the first member. The second end is configured to connect the second member to the body of the motor vehicle.

The second member may be attached by at least one mechanical fastener to the first member. The first member may be made of high strength aluminum alloy. The high strength aluminum alloy is preferably 6082 T6 or 6013 T6 aluminum alloy. However, any 6XXX or 7XXX series aluminum alloy as designated by the Aluminum Association may be used for the first member. The first member may be an extruded aluminum alloy member.

The first member may define different cross-sectional profiles along the length of the first member. The different cross-sectional profiles may be in the form of a circle, a square, an oval, a rectangle, a hexagon, and a combination thereof.

The second member may be made of aluminum alloy. The aluminum alloy is preferably A356 T6 aluminum alloy. However, any 3XX series aluminum alloy as designated by the Aluminum Association may be used for the second member. The second member may be a cast aluminum alloy member. The second member may define an I-beam cross section.

The second member may comprise a pair of flanges formed at the first end and defining a recess therebetween. The first member may be received and secured in the recess, for example by mechanical fasteners. The second member may further comprise a pair of circular ears formed at the second end and configured to receive a bushing used to connect the second member to the body of the motor vehicle. The bushing may be a rubber bushing. The first and second members may each be made of aluminum alloy.

The present invention is further directed to a method of assembling a control arm for a motor vehicle suspension system. The method may include the steps of providing a first member comprising an elongated hollow member configured for connection to a motor vehicle suspension; providing a second member having a first end and a second end; and attaching the first end of the second member to the first member to form the control arm. The second end of the second member may be configured for connection to the body of the motor vehicle.

The second member may be attached by at least one mechanical fastener to the first member. The method may further comprise the step of extruding the first member from aluminum alloy. The aluminum alloy may be high strength aluminum alloy. The method may further comprise the step of shaping the first member such that the first member comprises different cross-sectional profiles along its length. The method may further comprise the step of casting the second member from aluminum alloy.

Further details and advantages of the present invention will become apparent from the following detailed description when read in conjunction with the drawings.

DETAILED DESCRIPTION OF THE INVENTION

Figure 1:
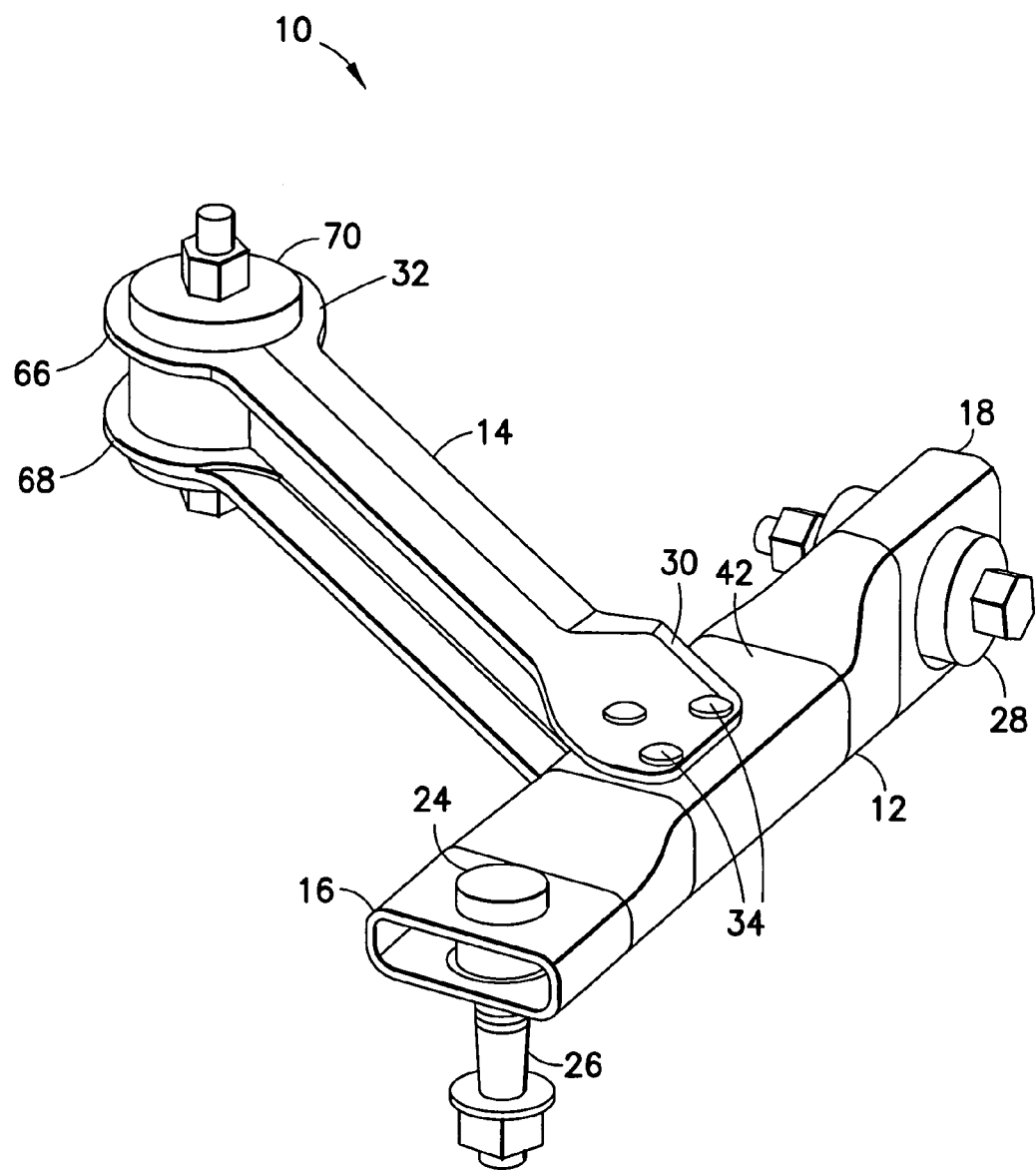
FIG. 1 is a perspective view of a control arm for a motor vehicle suspension system in accordance with the present invention.

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed hereinafter are not to be considered limiting.

This application incorporates herein by reference all subject matter set forth in U.S. patent application Ser. No. 10/271,462 filed on the same day as this application, Oct. 16, 2000, and entitled "Modular Front End For Motor Vehicle" and naming Dinesh C. Seksaria, Edward A. Timiko, John W. Cobes, Todd L. Summe, Kevin R. Pinegar, Thomas J. Murphy as inventors.

Referring to FIG. 1, a lower control arm 10 for a motor vehicle suspension system (not shown) is illustrated. The lower control arm 10 (hereinafter "control arm 10") is a multi-component product (i.e., non-unitary). The control arm 10 is comprised of a first member 12 and a second member 14. The first member 12 is adapted to carry the major portion of the loading on the control arm 10 when in use in the motor vehicle suspension system.

Figure 2:
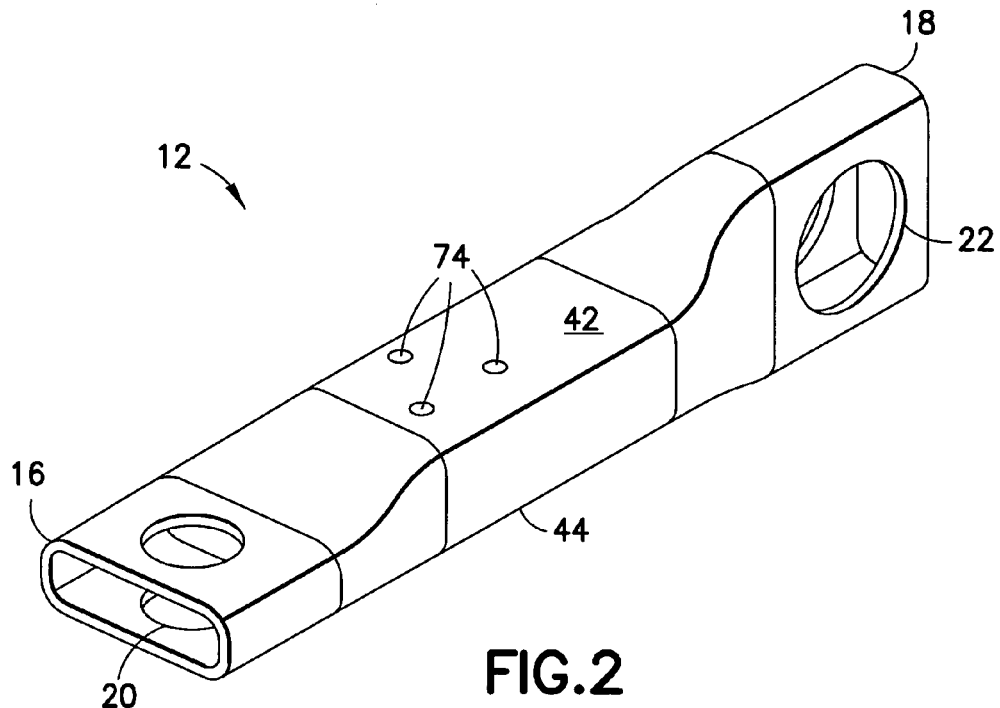
FIG. 2 is a perspective view of a first member of the control arm shown in FIG. 1.
Figure 3:
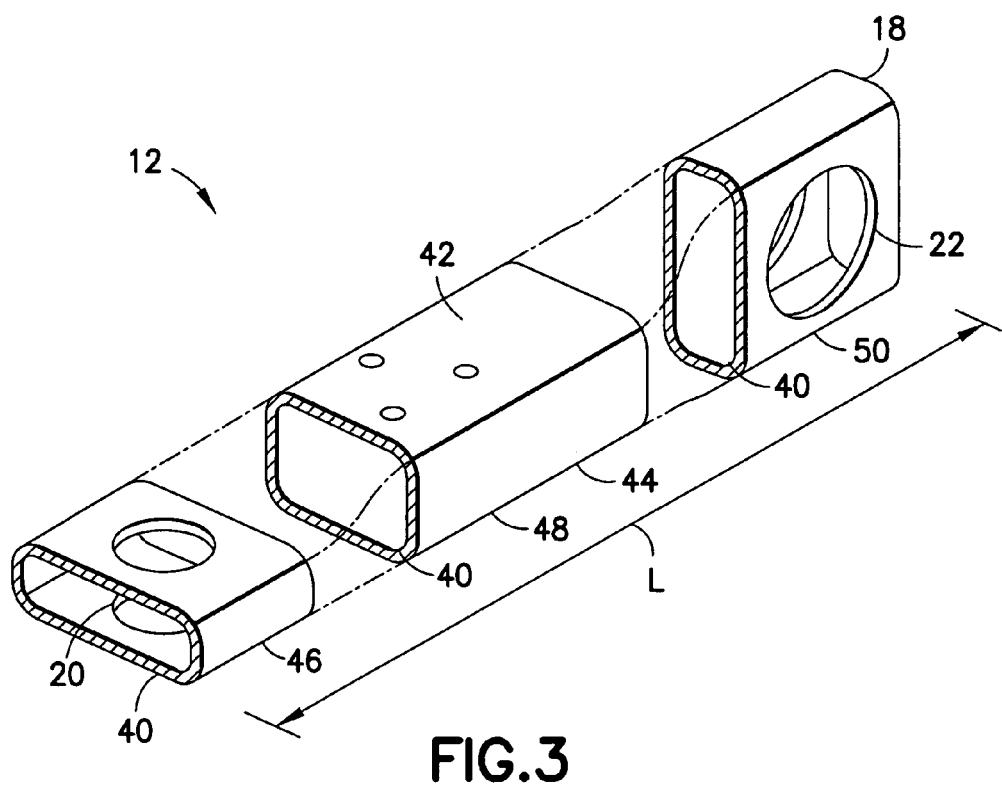
FIG. 3 is perspective view of the first member shown in FIG. 2 showing different cross sectional profiles formed along the length of the first member.
Figure 4:
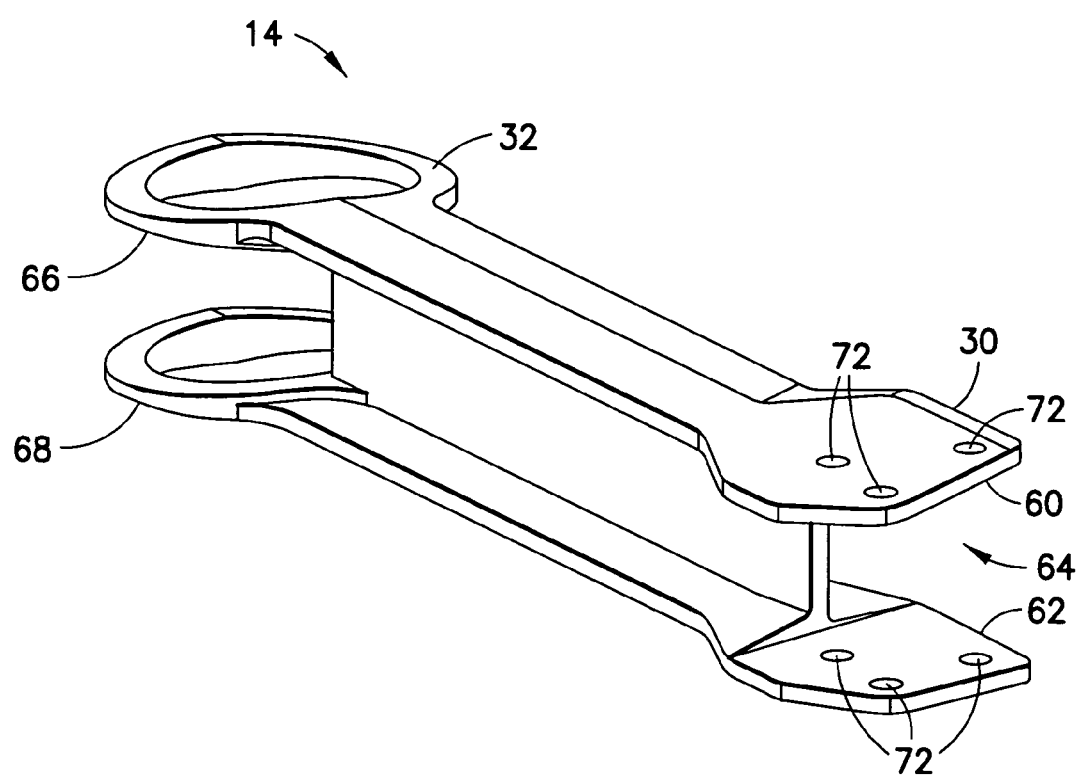
FIG. 4 is a perspective view of a second member of the control arm shown in FIG. 1.
Figure 5:
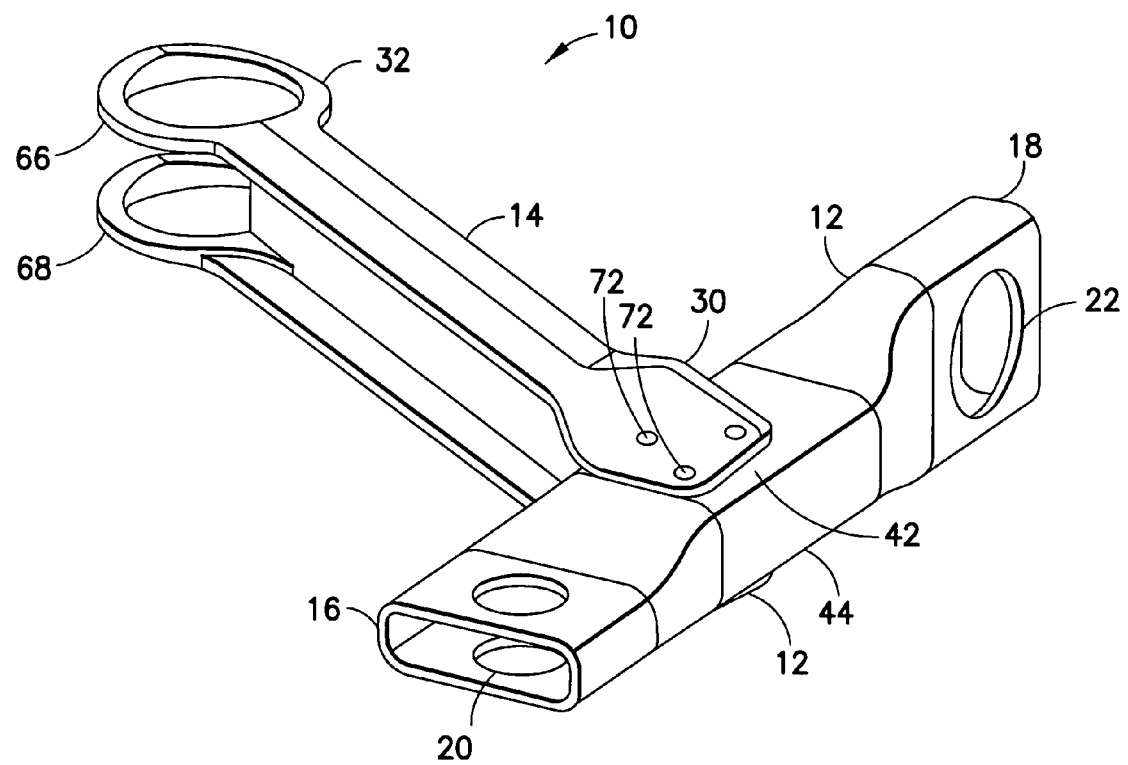
FIG. 5 is a partially assembled and perspective view of the control arm of FIG. 1.
Figure 6:
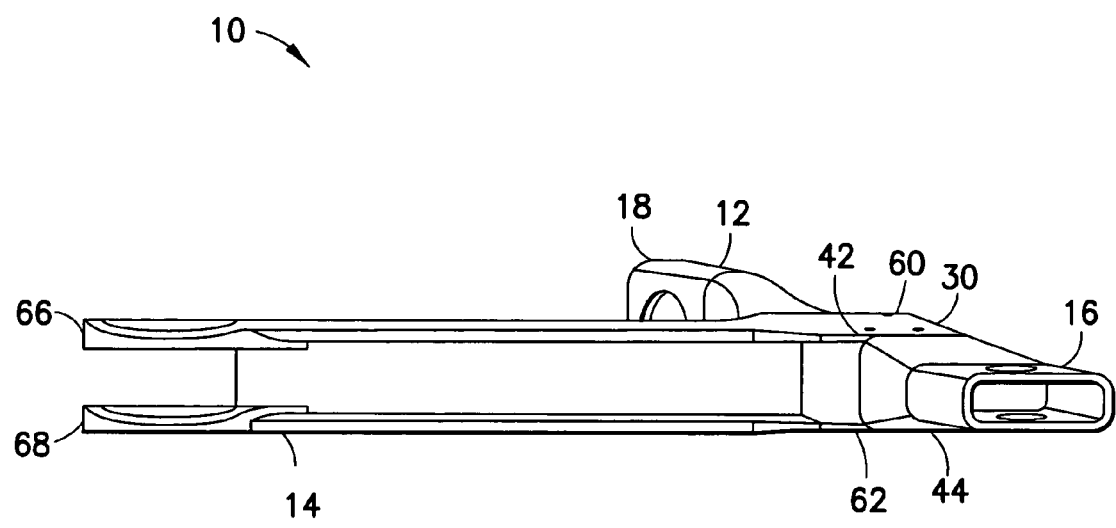
FIG. 6 is a side view of the partially assembled control arm shown in FIG. 5.

Referring to FIGS. 1–3, the first member 12 is an elongated hollow member having a first end 16 and a second end 18. A pair of openings 20, 22 is defined adjacent the first and second ends 16, 18 of the first member 12, respectively. The openings 20, 22 extend transversely through the first member 12. The first opening 20 receives a bushing 24, preferably a tapered bushing, which is used to connect the first member 12 to the motor vehicle suspension system. The bushing 24 is received rotatably in the first opening 20, and may be a rubber bushing. The bushing 24 includes a spindle 26 used to connect the bushing 24 to the motor vehicle suspension. A second bushing 28 is received in the second opening 22 defined through the first member 12 to connect the first member 12 to the body (not shown) of the motor vehicle, such as the frame or engine support structure of the motor vehicle. The second bushing 28 may be a rubber bushing. As shown in FIGS. 1–3, the first member 12 preferably has a generally tubular structure.

Referring to FIGS. 1–4, the second member 14 has a solid cross section. The second member 14 has a first end 30 attached to the first member 12 and a second end 32 configured for connection to the body (not shown) of the motor vehicle, such as the frame or engine support structure. The first end 30 of the second member 14 is attached by a plurality of mechanical fasteners 34 to the first member 12. The first end 30 of the second member 14 is shown in FIG. 1 attached to the first member 12 by rivets, as an example. However, any equivalent mechanical fastener, such as nuts and bolts may, be used for the connection between the first and second members 14, 16.

The first member 12 is preferably made of high strength aluminum alloy, such as 6082 T6 or 6013 T6 aluminum alloy. However, any 6XXX or 7XXX series aluminum alloy as designated by the Aluminum Association may be used for the first member 12. The first member 12 is preferably an extruded aluminum alloy member having a hollow cross section. The second member 14 is also preferably made of aluminum alloy, such as A356 T6 aluminum alloy. However, any 3XX series aluminum alloy as designated by the Aluminum Association may be used for the second member 14. Preferably, the second member 14 is a cast aluminum alloy member.

The tubular first member 12 may be mass-produced using extruding techniques well known in the art and at relatively low cost. The component nature of the control arm 10 allows the use of a reduced size second member 14, which makes casting the second member 14 from aluminum alloy economically efficient. The combination of an extruded aluminum first member 12 and a cast aluminum second member 14 reduces production costs while maintaining the required performance characteristics of the control arm 10. Typical prior art cast lower control arms have dimensions on the order of 20"×20"×4". The control arm 10 of the present invention will have similar overall dimension, but the two-piece construction of the control arm 10 allows the use of a cast second member 14 having dimensions in the range of about 12"×4"×4". Accordingly, the production costs for the cast second member 14 are substantially reduced over prior art cast lower control arms, significantly reducing the overall cost of manufacture for the control arm 10 of the present invention without sacrificing structural performance characteristics.

As stated previously, the first member 12 has a generally hollow cross section. The first member 12 is preferably formed to have different cross-sectional profiles 40 along the length L of the first member 12. For example, after extruding the first member 12 as a tubular or hollow structure, the first member may be mechanically pressed to have the different cross-sectional profiles 40 illustrated in FIG. 3. The cross-sectional profiles 40 define mating surfaces 42, 44 on opposite sides of the first member 12 for engagement by the second member 14. As best shown in FIG. 3, the extruded first member 12 generally has three different cross-sectional profiles 40 along its length L. Proceeding from the first end 16 to the second end 18 of the first member 12, a first portion 46 of the first member 12 has a generally flat rectangular shaped profile 40 with rounded ends (i.e., substantially semi-circular). This first portion 46 transitions to a second portion 48 of the first member 12 having a generally square shaped cross-sectional profile 40. The second portion 48 of the first member 12 transitions to a third portion 50 of the first member 12. The third portion 50 has a generally upstanding rectangular shaped cross-sectional profile 40. The use of different cross-sectional profiles 40 also improves the structural characteristics of the first member 12, such as stiffness, strength, and durability. Other cross-sectional profiles 40 may used in the first member 12. Examples of the different cross-sectional profiles 40 that may be used in the first member 12 include circular, square, oval, rectangular, hexagonal, and various combinations thereof (i.e., the rectangular and circular combination of the first portion 46).

Referring to FIGS. 1–6, the second member 14 of the control arm 10 has a solid cross section, preferably in the form of an I-beam cross section, as shown. The first end 30 of the second member 14 has a pair of opposing flanges 60, 62 that define a recess 64 therebetween. The first member 12 is received and secured in the recess 64 defined between the pair of flanges 60, 62. The mechanical fasteners 34, discussed previously, secure the first member 12 in the recess 64 between the flanges 60, 62. The mechanical fasteners 34, while preferred, may be replaced by metallurgical connections (i.e., welds). The second end 32 of the second member 14 defines a pair of circular ears 66, 68. The ears 66, 68 are configured to receive a bushing 70, which connects the second member 14 to the motor vehicle body, such as the frame or engine support structure. The bushing 70 is received rotatably in the ears 66, 68 in a conventional manner and may be a rubber bushing.

With continued reference to FIGS. 1–6, the mating connection between the first member 12 and the recess 64 defined between the flanges 60, 62 is shown. The flanges 60, 62 engage the respective mating surfaces 42, 44 formed in the second portion 48 of the first member 12. A plurality of openings 72 is formed in the flanges 60, 62, which mate with corresponding apertures 74 defined in the second portion 48 of the first member 12. The mechanical fasteners 34 engage the mating openings 72 and apertures 74 to secure the first and second members 12, 14 in fixed relation. Once the first and second members 12, 14 are assembled in a fixed relationship, the first and second members 12, 14 may be secured to the motor vehicle suspension system and motor vehicle body at the locations and by the methods discussed previously.

The present invention provides a lower control arm for a motor vehicle suspension system that is inexpensive to manufacture while maintaining the required performance characteristics necessary to the suspension system. Combining extruded and cast components substantially reduces the overall cost of the lower control arm. The cast second member of the lower control arm is now reduced to a size that enables producing several cast parts in a single casting mold. The extruded, hollow portion of the first member in the use of aluminum alloy further reduce the weight in production cost of the lower control arm while maintaining the performance requirements of the lower control arm.

While specific embodiments of the invention were described hereinabove in detail, various modifications and alterations to the embodiments could be developed in light of the overall teachings of this disclosure. The presently preferred embodiment(s) described hereinabove is meant to be illustrative only and not limiting as to the scope of the invention, which is to be given to full breadth of the appended claims and any and all equivalents thereof.

The invention claimed is:

1. A control arm for a motor vehicle system, comprising:
   a first piece comprising a one-piece elongated hollow member having a first end and a second end and defining at least one opening extending transversely therethrough for connecting the first piece to the motor vehicle suspension; and
   a rigid second piece comprising a solid cross sectional cast member having a first end and a second end, the first end attached to the first piece between the first and second ends of the first piece to form a two piece control arm, wherein the second ends of the first piece and the rigid second piece connect the two piece control arm to a vehicle body.

2. The control arm of claim 1, wherein the rigid second piece is attached by at least one mechanical fastener to the first piece.

3. The control arm of claim 1, wherein the first piece is made of high strength aluminum alloy.

4. The control arm of claim 3, wherein the high strength aluminum alloy comprises 6082 T6 or 6013 aluminum alloy.

5. The control arm of claim 1, wherein the first piece is an extruded aluminum alloy member.

6. The control arm of claim 1, wherein the first piece defines different cross-sectional profiles along the length of the first piece.

7. The control arm of claim 6, wherein the different cross-sectional profiles are selected from the group consisting of a circle, square, an oval, a rectangle, a hexagon, and a combination thereof.

8. The control arm of claim 1, wherein the second piece is composed of an aluminum alloy comprising A356 T6 aluminum alloy.

9. The control arm of claim 8, wherein the aluminum alloy comprises A356 T6 aluminum alloy.

10. The control arm of claim 1, wherein the rigid second piece is a cast aluminum alloy member.

11. The control arm of claim 1, wherein the first piece and the rigid second piece are made of aluminum alloy.

12. A control arm for a motor vehicle suspension system comprising:
   a first piece comprising a one-piece elongated hollow member made of aluminum alloy and defining at least one opening extending transversely therethrough for connecting the first piece to the motor vehicle suspension system; and
   a rigid second piece comprising a solid cross sectional cast member of aluminum alloy and having a first end and a second end, the first end attached to the first piece to form a two piece control arm, the second end configured to connect the second piece to the body of the motor vehicle,
   wherein the one-piece elongated hollow member defines different cross-sectional profiles along the length of the first piece.

13. The control arm of claim 12, wherein the rigid second piece is attached by at least one mechanical fastener to the first piece.

14. A control arm for a motor vehicle suspension system, comprising:
   a first member comprising a one-piece elongated hollow member made of aluminum alloy and defining at least one opening extending transversely therethrough for connecting the first member to the motor vehicle suspension system; and
   a second member comprising a solid cross section member made of aluminum alloy and having a first end and a second end, the first end attached to the first member, the second end configured to connect the second member to the body of the motor vehicle,
   wherein the first member defines different cross-sectional profiles along the length of the first member, and
   wherein the second member defines an I-beam cross-sectional.

15. The control arm of claim 14, the second member comprising a pair of flanges formed at the first end and defining a recess therebetween, and the first member received and secured in the recess.

16. The control arm of claim 15, the second member comprising a pair of circular ears formed at the second end and configured to receive a bushing for connecting the second member to the body of the motor vehicle.

17. A method for assembling a control arm for a motor vehicle suspension system, comprising the steps of:
   providing a first piece comprising a one-piece elongated hollow member having a first end and a second end and configured for connection to a motor vehicle suspension system;
   casting a rigid second piece having a first end and a second end; and
   attaching the first end of the rigid second piece to the first piece between the first and second ends of the first piece to form a two piece control arm, wherein the second ends of the first piece and the rigid second piece connect the two piece control arm to a vehicle body.

18. The method of claim 17, wherein the rigid second piece is attached by at least one mechanical fastener to the first piece.

19. The method of claim 17, further comprising the step of extruding the first piece from an aluminum alloy.

20. The method of claim 19, wherein the aluminum alloy is high strength aluminum alloy.

21. The method of claim 19, further comprising the step of shaping the first piece such that the first piece comprises different cross-sectional profiles along the length of the first piece.

22. The method of claim 19, further comprising the step of casting the second piece from aluminum alloy.

23. A control arm for a motor vehicle suspension system, comprising:
   a first member comprising a one-piece elongate hollow member defining at least one opening extending transversely therethrough for connecting the first member to the motor vehicle suspension; and
   a second member comprising a solid cross sectional member having a first end and a second end, the first end attached to the first member, the second end configured to connect the second member to the body of the motor vehicle, wherein the second member defines an I-beam cross section.

24. The control arm of claim 23, the second member comprising a pair of flanges formed at the first end and defining a recess therebetween, the first member received and secured in the recess.

25. The control arm of claim 23, the second member comprising a pair of circular ears formed at the second end and configured to receive a busing for connecting the second member of the body of the motor vehicle.

26. The control arm of claim 23, wherein the first and second members are made of aluminum alloy; and the first member defines different cross-sectional profiles along the length of the first member.

* * * * *

UNITED STATES PATENT AND TRADEMARK OFFICE
CERTIFICATE OF CORRECTION

PATENT NO. : 7,163,219 B2
APPLICATION NO. : 10/271449
DATED : January 16, 2007
INVENTOR(S) : Seksaria et al.

It is certified that error appears in the above-identified patent and that said Letters Patent is hereby corrected as shown below:

In column 5, line 47, after "member", delete "in" and insert --and--.

In column 5, line 48, after "weight", delete "in" and insert --and--.

In column 8, line 23, line 3 of claim 25, after "a", delete "busing" and insert --bushing--.

Signed and Sealed this

Thirteenth Day of November, 2007

JON W. DUDAS
*Director of the United States Patent and Trademark Office*